United States Patent
Ito et al.

(10) Patent No.: US 8,724,735 B2
(45) Date of Patent: May 13, 2014

(54) QUADRATURE MODULATOR, SIGNAL GENERATING DEVICE, AND QUADRATURE MODULATION METHOD

(75) Inventors: Shinichi Ito, Atsugi (JP); Tatsuro Hanaya, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 147 days.

(21) Appl. No.: 13/468,481

(22) Filed: May 10, 2012

(65) Prior Publication Data

US 2012/0300876 A1    Nov. 29, 2012

(30) Foreign Application Priority Data

May 23, 2011 (JP) ................................. 2011-114842

(51) Int. Cl.
*H04L 27/36* (2006.01)
*H04B 15/00* (2006.01)

(52) U.S. Cl.
USPC .......................................... 375/296; 375/308

(58) Field of Classification Search
None
See application file for complete search history.

(56) References Cited

U.S. PATENT DOCUMENTS

| 7,242,728 B2 * | 7/2007 | Kanazawa | 375/296 |
| 7,327,202 B2 | 2/2008 | Zhou | |
| 2002/0137487 A1 * | 9/2002 | Yochem | 455/303 |
| 2006/0062324 A1 * | 3/2006 | Naito et al. | 375/296 |

FOREIGN PATENT DOCUMENTS

| JP | 3737819 B2 | 11/2005 |
| JP | 2011024200 A | 2/2011 |
| WO | 2009008445 A1 | 1/2009 |

* cited by examiner

*Primary Examiner* — Chieh M Fan
*Assistant Examiner* — Bahman Badipour
(74) *Attorney, Agent, or Firm* — Pearne & Gordon LLP (57) ABSTRACT

To provide a quadrature modulator, a signal generating device, and a quadrature modulation method capable of correcting a gain balance error, a zero offset error, and an orthogonality error that occur during quadrature modulation. The quadrature modulator 20 includes a quadrature modulation unit 22, a quadrature modulation error calculating unit 40 that calculates quadrature modulation errors on the basis of the power of a quadrature-modulated signal output from the quadrature modulation unit 22, and an error correcting unit 30 that corrects a baseband signal such that the quadrature modulation errors are removed. The quadrature modulation error calculating unit 40 includes a power measuring unit 41 that measures the power of the quadrature-modulated signal, a gain balance error calculating unit 42, a zero offset error calculating unit 43, and an orthogonality error calculating unit 44.

8 Claims, 8 Drawing Sheets

QUADRATURE MODULATOR, SIGNAL GENERATING DEVICE, AND QUADRATURE MODULATION METHOD

TECHNICAL FIELD

The present invention relates to a quadrature modulator, a signal generating device, and a quadrature modulation method which correct quadrature modulation errors that occur during quadrature modulation.

BACKGROUND ART

Figure 8:
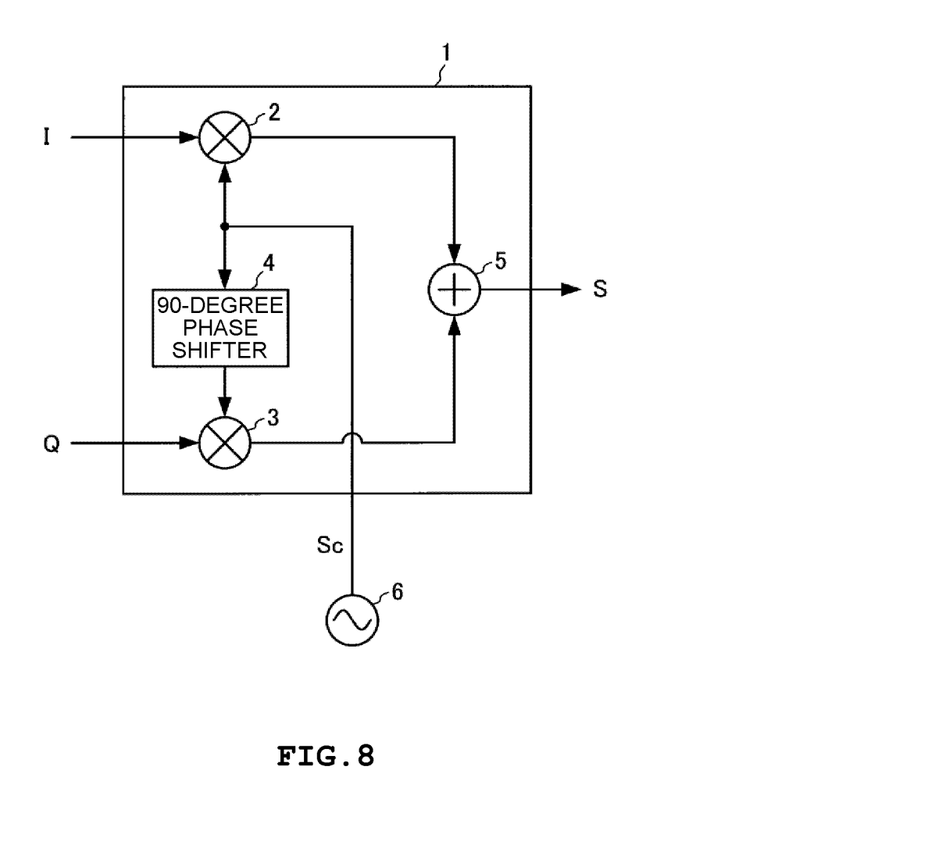
FIG. 8 is a block diagram illustrating the configuration of a quadrature modulator according to the related art.

In recent years, a quadrature modulator such as that shown in FIG. 8 has generally been used as a modulator for digital communication. A quadrature modulator 1 shown in FIG. 8 includes multipliers 2 and 3, a 90-degree phase shifter 4, and an adder 5.

The multipliers 2 and 3 respectively receive two signals called an I-phase component (in-phase component) and a Q-phase component (quadrature component), respectively. The multiplier 2 multiplies the I-phase component by a carrier wave signal Sc from a local oscillator 6. The multiplier 3 multiplies the Q-phase component by the carrier wave signal Sc which is shifted by 90 degrees by the 90-degree phase shifter 4. The adder 5 adds the output signals from the multipliers 2 and 3 and outputs a quadrature-modulated signal S.

In the quadrature modulator 1, it has been known that the I-phase component and the Q-phase component included in the quadrature-modulated signal S to be output are not exactly orthogonal to each other due to, for example, incorrect settings or errors in the 90-degree phase shifter 4, which results in a modulation error. The modulation error is called an orthogonality error. For example, Patent Document 1 discloses a quadrature modulation device as a device for detecting orthogonality errors.

The quadrature modulation device disclosed in Patent Document 1 includes a pair of variable voltage supplies which generate a pair of DC voltages to be added to the I-phase component and the Q-phase component input to a quadrature modulator and DC voltage combination search means which adds the pair of DC voltages generated by the pair of variable voltage supplies to the I-phase component and the Q-phase component while changing the pair of DC voltages and searches for a plurality of pairs of DC voltage combinations causing the level of the modulation signal to be a reference level. According to this configuration, the quadrature modulation device disclosed in Patent Document 1 can calculate the orthogonality error of the quadrature-modulated signal on the basis of each value of the plurality of pairs of DC voltage combinations that were searched for and correct the orthogonality error.

RELATED ART DOCUMENT

Patent Document

[Patent Document 1] Japanese Patent No. 3737819 (Family U.S. Pat. No. 7,242,728 B2)

DISCLOSURE OF THE INVENTION

Problem that the Invention is to Solve

However, the quadrature modulation device disclosed in Patent Document 1 can correct the orthogonality error, but cannot correct other errors that occur during quadrature modulation, such as, a gain balance error and a zero offset error. Therefore, it is preferable to improve the quadrature modulation device.

The invention has been made in view of the above-mentioned problems and an object of the invention is to provide a quadrature modulator, a signal generating device, and a quadrature modulation method capable of correcting a gain balance error, a zero offset error, and an orthogonality error that occur during quadrature modulation.

Means for Solving Problem

According to an aspect of the invention, there is provided a quadrature modulator (20) that corrects quadrature modulation errors included in a quadrature-modulated signal. The quadrature modulator includes: a quadrature modulation unit (22) that receives a baseband signal including an in-phase component and a quadrature component, modulates two carrier wave signals which are orthogonal to each other using the baseband signal to obtain the quadrature-modulated signal, and outputs the quadrature-modulated signal; a quadrature modulation error calculating unit (40); and an error correcting unit (30). The quadrature modulation errors include a gain balance error indicating that the gains of the in-phase component and the quadrature component are different from each other, a zero offset error indicating the offsets of an in-phase component axis and a quadrature component axis from the origins of each axis, and an orthogonality error indicating the deviation of orthogonalities of the in-phase component axis and the quadrature component axis. The quadrature modulation error calculating unit calculates the gain balance error, the zero offset error, and the orthogonality error included in the quadrature modulation errors on the basis of the power of the quadrature-modulated signal output from the quadrature modulation unit when the baseband signal in which the in-phase component and the quadrature component are predetermined DC voltages is received. The error correcting unit corrects the baseband signal such that the quadrature modulation errors calculated by the quadrature modulation error calculating unit are removed.

According to this configuration, in the quadrature modulator according to the above-mentioned aspect of the invention, since the quadrature modulation error calculating unit calculates the quadrature modulation errors on the basis of the power of the quadrature-modulated signal output from the quadrature modulation unit, it is possible to correct the gain balance error, the zero offset error, and the orthogonality error that occur during quadrature modulation.

In the quadrature modulator according to the above-mentioned aspect, the error correcting unit may include: a first multiplier (31) that multiplies the in-phase component of the input baseband signal by a gain balance correction value for removing the gain balance error of the in-phase component; a second multiplier (32) that multiplies the quadrature component of the input baseband signal by a gain balance correction value for removing the gain balance error of the quadrature component; a third multiplier (33) that multiplies the multiplication result of the second multiplier by an orthogonality correction value for removing the orthogonality error; a fourth multiplier (34) that multiplies the multiplication result of the first multiplier by the orthogonality correction value; a first adder (35) that adds the multiplication result of the first multiplier and the multiplication result of the third multiplier; a second adder (36) that adds the multiplication result of the second multiplier and the multiplication result of the fourth multiplier; a third adder (37) that adds the addition result of the first adder and a zero offset correction value for removing the zero offset error of the in-phase component and outputs the addition result to the quadrature modulation unit; and a fourth adder (38) that adds the addition result of the second adder and a zero offset correction value for removing the zero offset error of the quadrature component and outputs the addition result to the quadrature modulation unit.

According to this configuration, the quadrature modulator according to the above-mentioned aspect of the invention can correct the gain balance error, the zero offset error, and the orthogonality error that occur during quadrature modulation.

In the quadrature modulator according to the above-mentioned aspect, the quadrature modulation error calculating unit may include: a power measuring unit (41) that measures the power of the quadrature-modulated signal output from the quadrature modulation unit; a gain balance error calculating unit (42) that calculates the gain balance error on the basis of the power measured by the power measuring unit; a zero offset error calculating unit (43) that calculates the zero offset error on the basis of the power measured by the power measuring unit; and an orthogonality error calculating unit (44) that calculates the orthogonality error on the basis of the power measured by the power measuring unit.

According to this configuration, the quadrature modulator according to the above-mentioned aspect of the invention can correct the gain balance error, the zero offset error, and the orthogonality error that occur during quadrature modulation.

In the quadrature modulator according to the above-mentioned aspect, the power measuring unit may measure power values of the quadrature-modulated signals when the in-phase component of the baseband signal is three different predetermined DC voltages and the quadrature component of the baseband signal is a DC voltage of 0 V, power values of the quadrature-modulated signals when the quadrature component of the baseband signal is three different predetermined DC voltages and the in-phase component of the baseband signal is a DC voltage of 0 V, and power values of the quadrature-modulated signals when the in-phase component and the quadrature component of the baseband signal are different predetermined DC voltages.

According to another aspect of the invention, a signal generating device includes: the quadrature modulator according to the above-mentioned aspect; baseband signal supply means (11) for supplying the baseband signal to the error correcting unit; carrier wave signal generating means (13) for generating the carrier wave signal and outputting the carrier wave signal to the quadrature modulation unit; and a mode switching unit (14) that switches an operation mode between an error calculation mode in which the quadrature modulation error calculating unit calculates the quadrature modulation errors and a signal output mode in which the quadrature modulator outputs the quadrature-modulated signal from which the quadrature modulation errors have been removed.

According this configuration, the signal generating device according to the above-mentioned aspect of the invention can output the quadrature-modulated signal in which the gain balance error, the zero offset error, and the orthogonality error that occur during quadrature modulation are corrected in the signal output mode, on the basis of the quadrature modulation errors calculated in the error calculation mode.

According to still another aspect of the invention, there is provided a quadrature modulation method that corrects quadrature modulation errors in a quadrature-modulated signal which is obtained by modulating two carrier wave signals orthogonal to each other using a baseband signal including an in-phase component and a quadrature component and outputs the quadrature-modulated signal. The quadrature modulation errors include a gain balance error indicating that the gains of the in-phase component and the quadrature component are different from each other, a zero offset error indicating the offsets of an in-phase component axis and a quadrature component axis from the origins of each axis, and an orthogonality error indicating the deviation of orthogonalities of the in-phase component axis and the quadrature component axis. The quadrature modulation method includes: a quadrature modulation error calculating step (S24) of calculating the gain balance error, the zero offset error, and the orthogonality error included in the quadrature modulation errors on the basis of the power of the quadrature-modulated signal when the baseband signal in which the in-phase component and the quadrature component are predetermined DC voltages is received; an error correcting step (S40) of correcting the baseband signal such that the quadrature modulation errors calculated in the quadrature modulation error calculating step are removed; and a quadrature-modulated signal output step (S35) of receiving the baseband signal corrected such that the quadrature modulation errors are removed and outputting the quadrature-modulated signal.

According to this configuration, in the quadrature modulation method according to the above-mentioned aspect of the invention, since the quadrature modulation errors are calculated on the basis of the power of the quadrature-modulated signal in the quadrature modulation error calculating step, it is possible to correct the gain balance error, the zero offset error, and the orthogonality error that occur during quadrature modulation.

In the quadrature modulation method according to the above-mentioned aspect, the error correcting step may include: a first multiplication step (S41) of multiplying the in-phase component of the input baseband signal by a gain balance correction value for removing the gain balance error of the in-phase component; a second multiplication step (S42) of multiplying the quadrature component of the input baseband signal by a gain balance correction value for removing the gain balance error of the quadrature component; a third multiplication step (S43) of multiplying the multiplication result in the second multiplication step by an orthogonality correction value for removing the orthogonality error; a fourth multiplication step (S44) of multiplying the multiplication result in the first multiplication step by the orthogonality correction value; a first addition step (S45) of adding the multiplication result in the first multiplication step and the multiplication result in the third multiplication step; a second addition step (S46) of adding the multiplication result in the second multiplication step and the multiplication result in the fourth multiplication step; a third addition step (S47) of adding the addition result in the first addition step and a zero offset correction value for removing the zero offset error of the in-phase component; and a fourth addition step (S48) of adding the addition result in the second addition step and a zero offset correction value for removing the zero offset error of the quadrature component.

According to this configuration, the quadrature modulation method according to the above-mentioned aspect of the invention can correct the gain balance error, the zero offset error, and the orthogonality error that occur during quadrature modulation.

In the quadrature modulation method according to the above-mentioned aspect of the invention, the quadrature modulation error calculating step may include a power measuring step (S21, S22, S23) of measuring the power of the quadrature-modulated signal and calculates the gain balance error, the zero offset error, and the orthogonality error on the basis of the measured power.

According to this configuration, the quadrature modulation method according to the above-mentioned aspect of the invention can calculate and correct the gain balance error, the zero offset error, and the orthogonality error that occur during quadrature modulation.

In the quadrature modulation method according to the above-mentioned aspect of the invention, the power measuring step may measure power values of the quadrature-modulated signals when the in-phase component of the baseband signal is three different predetermined DC voltages and the quadrature component of the baseband signal is a DC voltage of 0 V, power values of the quadrature-modulated signals when the quadrature component of the baseband signal is three different predetermined DC voltages and the in-phase component of the baseband signal is a DC voltage of 0 V, and power values of the quadrature-modulated signals when the in-phase component and the quadrature component of the baseband signal are different predetermined DC voltages.

Advantage of the Invention

According to the above-mentioned aspects of the invention, it is possible to provide a quadrature modulator, a signal generating device, and a quadrature modulation method capable of correcting a gain balance error, a zero offset error, and an orthogonality error that occur during quadrature modulation.

BEST MODE FOR CARRYING OUT THE INVENTION

Hereinafter, exemplary embodiments of the invention will be described with reference to the accompanying drawings.

First, the configuration of a signal generating device according to an embodiment of the invention will be described.

Figure 1:
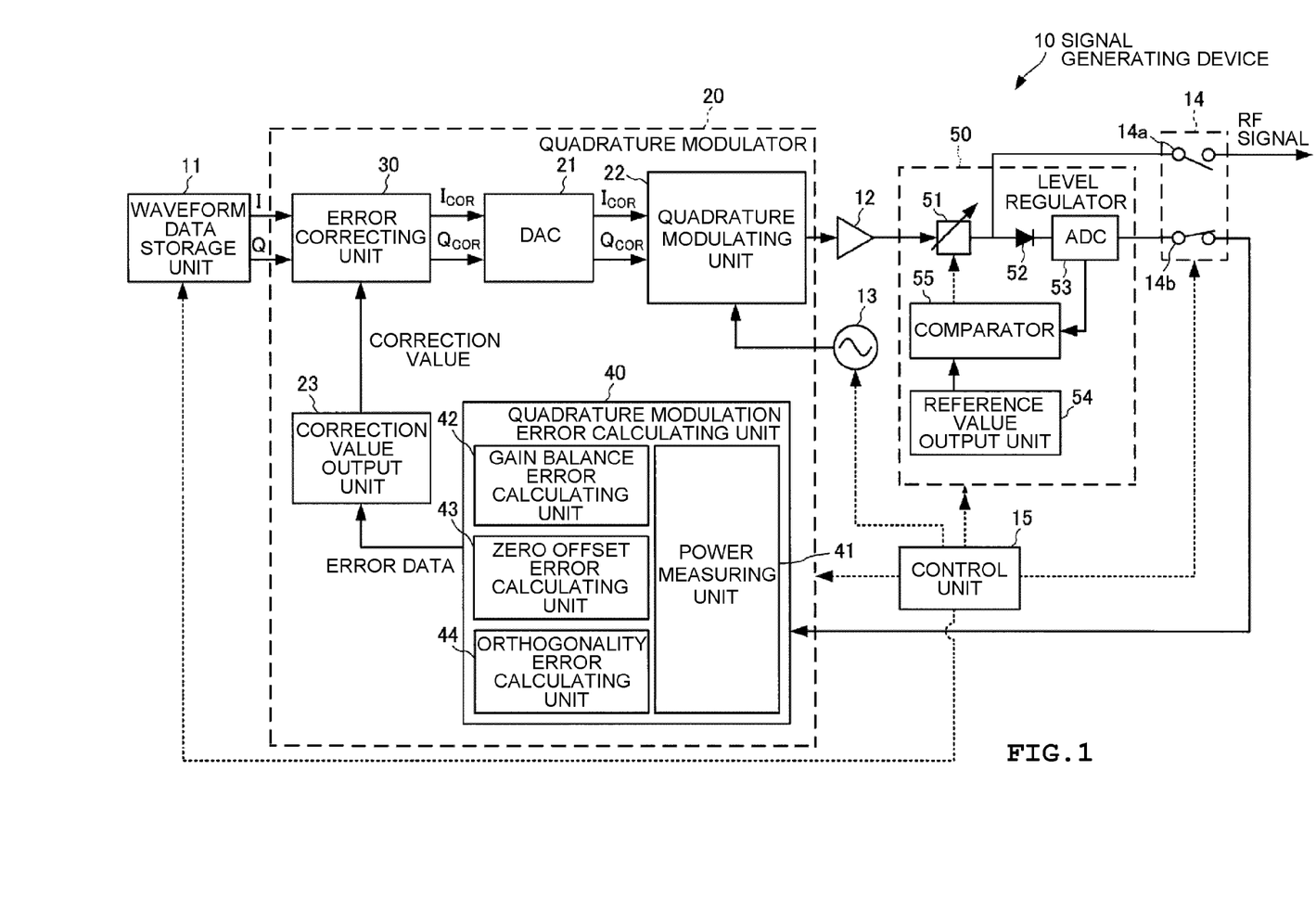
FIG. 1 is a block diagram illustrating the configuration of a signal generating device according to an embodiment of the invention.

As shown in FIG. 1, a signal generating device 10 according to this embodiment includes a waveform data storage unit 11, a quadrature modulator 20, an amplifier 12, a local oscillator 13, a mode switching unit 14, a control unit 15, and a level regulator 50.

The quadrature modulator 20 includes an error correcting unit 30, a digital-to-analog converter (hereinafter, referred to as a "DAC") 21, a quadrature modulation unit 22, a correction value output unit 23, and a quadrature modulation error calculating unit 40.

The level regulator 50 includes a variable attenuator 51, a detector 52, an analog-to-digital converter (hereinafter, referred to as "ADC") 53, a reference value output unit 54, and a comparator 55.

The waveform data storage unit 11 stores digital waveform data and is configured so as to store the waveform data (hereinafter, simply referred to as "test waveform data") of the baseband of an I-phase component and a Q-phase component which are prepared in advance to test a device to be tested (not shown). The test waveform data is generated by, for example, a DSP (Digital Signal Processor) (not shown). The waveform data storage unit 11 forms baseband signal supply means according to the invention.

The error correcting unit 30 corrects the test waveform data of the I-phase component and the Q-phase component input from the waveform data storage unit 11 on the basis of the correction value output from the correction value output unit 23.

The DAC 21 converts the digital test waveform data output from the error correcting unit 30 into analog test waveform data and outputs the converted analog test waveform data to the quadrature modulation unit 22.

The local oscillator 13 generates a carrier wave signal with a predetermined frequency on the basis of a local oscillation control signal output from the control unit 15 and outputs the carrier wave signal to the quadrature modulation unit 22. The local oscillator 13 forms carrier wave signal generating means according to the invention.

The quadrature modulation unit 22 performs quadrature modulation on the carrier wave signal from the local oscillator 13 using the test waveform data of the I-phase component and the Q-phase component and outputs a quadrature-modulated signal to the amplifier 12. The quadrature modulation unit 22 has the same configuration as the quadrature modulator 1 shown in FIG. 8.

The amplifier 12 amplifies the quadrature-modulated signal output from the quadrature modulation unit 22 and outputs the amplified quadrature-modulated signal to the variable attenuator 51 of the level regulator 50.

The variable attenuator 51 is configured so as to have the amount of attenuation for attenuating the power level of an output signal from the amplifier 12 according to an attenuation setting signal from the comparator 55. The signal which is attenuated to a predetermined power level is output to the detector 52 and the device to be tested.

The detector 52 detects the output signal from the variable attenuator 51 and outputs the detected signal to the ADC 53.

The ADC 53 converts the analog signal detected by the detector 52 into a digital signal and outputs the converted signal to the mode switching unit 14 and the comparator 55.

The reference value output unit 54 generates a signal with a predetermined reference level and outputs the signal to the comparator 55.

The comparator 55 compares the level of the output signal from the ADC 53 and the level of the output signal from the reference value output unit 54 and outputs an attenuation setting signal to the variable attenuator 51 such that the power value of the output signal from the variable attenuator 51 is, for example, −10 dBm.

The mode switching unit 14 includes a switch 14a which is provided between the variable attenuator 51 and the device to be tested and a switch 14b which is provided between the ADC 53 and the quadrature modulation error calculating unit 40. The switches 14a and 14b are set such that one of the switches is turned on and the other switch is turned off on the basis of a mode switching signal from the control unit 15. The modes indicated by the control unit 15 include an error calculation mode in which the quadrature modulation error calculating unit 40 calculates quadrature modulation errors and a signal output mode in which a test signal whose quadrature modulation errors are corrected is output to the device to be tested. The mode switching unit 14 shown in FIG. 1 is in the error calculation mode in which the switch 14a is turned off and the switch 14b is turned on. FIG. 1 shows an image in which the mode switching unit 14 includes the physical switches 14a and 14b, but the invention is not limited thereto. The mode switching unit 14 may have any configuration as long as it can be switched between the error calculation mode and the signal output mode.

The control unit 15 is, for example, a microcomputer and controls all devices. For example, the control unit 15 outputs a waveform designation signal to the waveform data storage unit 11 so as to determine waveform data output from the waveform data storage unit 11.

The quadrature modulation error calculating unit 40 includes a power measuring unit 41, a gain balance error calculating unit 42, a zero offset error calculating unit 43, and an orthogonality error calculating unit 44.

The power measuring unit 41 measures the power of the quadrature-modulated signal output from the level regulator 50.

The gain balance error calculating unit 42 calculates a gain balance error on the basis of the power of the quadrature-modulated signal measured by the power measuring unit 41.

The zero offset error calculating unit 43 calculates a zero offset error on the basis of the power of the quadrature-modulated signal measured by the power measuring unit 41.

The orthogonality error calculating unit 44 calculates an orthogonality error on the basis of the power of the quadrature-modulated signal measured by the power measuring unit 41.

The correction value output unit 23 receives the data of the gain balance error, the zero offset error, and the orthogonality error calculated by the quadrature modulation error calculating unit 40, calculates correction values for removing the quadrature modulation errors, and outputs the correction values to the error correcting unit.

As described above, the quadrature modulation errors include the gain balance error, the zero offset error, and the orthogonality error that occur during quadrature modulation. Next, the quadrature modulation errors will be described with reference to the diagram of FIG. 8 illustrating the configuration of the quadrature modulator 1 and FIG. 2.

Figure 2:
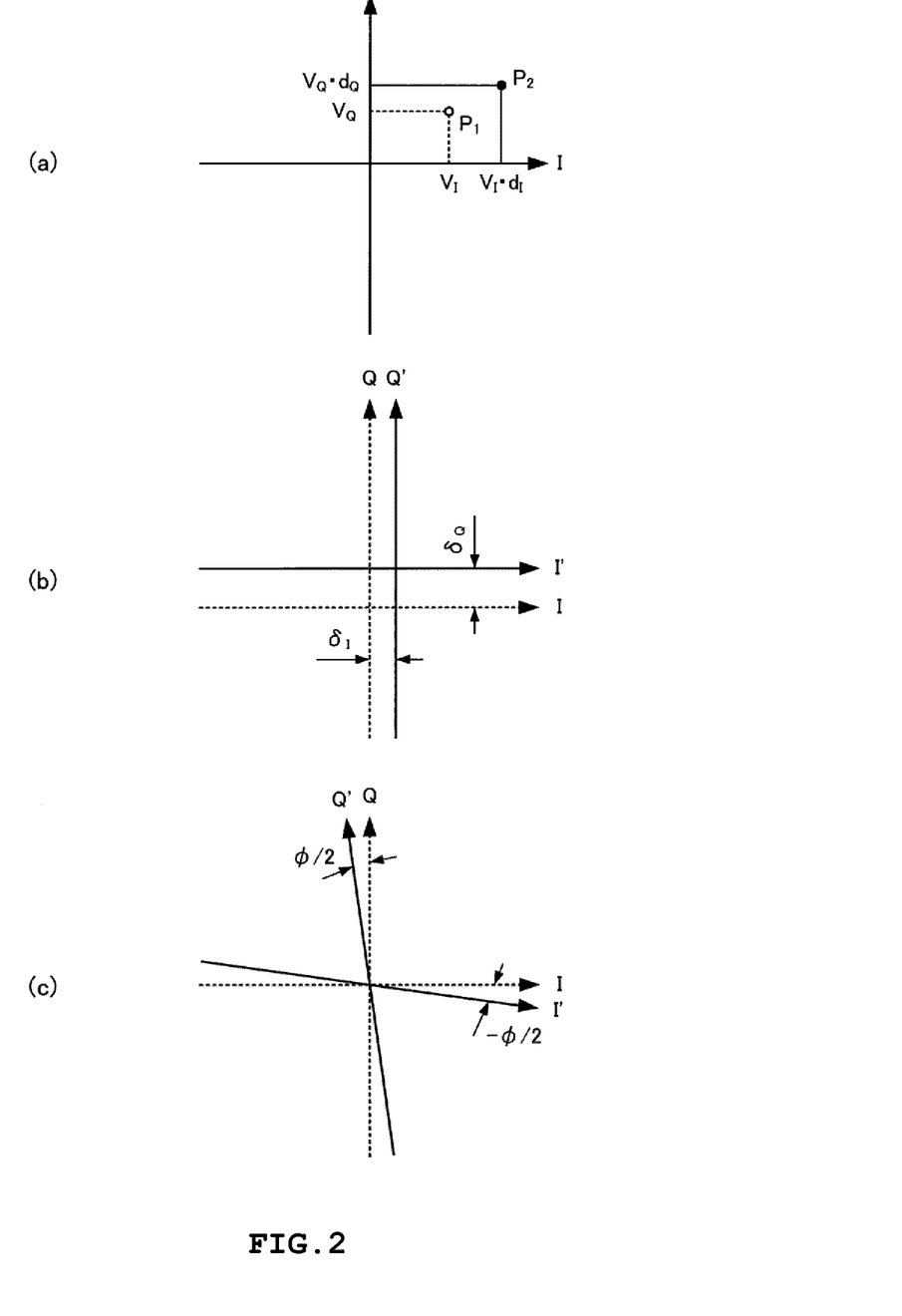
FIG. 2 is a diagram illustrating the quadrature modulation errors of the signal generating device according to the embodiment of the invention.

As shown in FIG. 2(*a*), the gain balance error occurs when a signal P$_1$ input to the quadrature modulator 1 is output as a signal P$_2$. Specifically, when the level of an I-phase component of the signal P$_1$ is V$_I$, the level of a Q-phase component of the signal P$_1$ is V$_Q$, the level of an I-phase component of the signal P$_2$ is V$_I$·d$_I$, and the level of a Q-phase component of the signal P$_2$ is V$_Q$·d$_Q$ (d$_I$≠d$_Q$), d$_I$ and d$_Q$ are the gain balance errors. When d$_I$ is equal to d$_Q$, that is, when the levels of the I-phase component and the Q-phase component are balanced, a circuit in the subsequent stage can adjust the levels, which does not cause any problems.

As shown in FIG. 2(*b*), the zero offset error is caused by the offset of the origin of the I-phase axis and the origin of the Q-phase axis due to a DC component, and the zero offset errors of the I-phase axis and the Q-phase axis are represented by δ$_I$ and δ$_Q$, respectively.

As shown in FIG. 2(*c*), the orthogonality error indicates the deviation of the intersection angle between the I-phase axis and the Q-phase axis from π/2 [rad]. For example, when the inclination of the Q-phase axis with respect to the I-phase axis is (π/2+φ) [rad], φ is the orthogonality error.

Next, a method of calculating the quadrature modulation errors will be described. In the quadrature modulator 1 shown in FIG. 8, it is assumed that a multiplier 2 receives an I-phase component V$_I$ [mV] of the baseband signal and a multiplier 3 receives a Q-phase component V$_Q$ [mV] of the baseband signal (specifically, in the error calculation mode, each unit operates as follows. The waveform data storage unit 11 outputs waveform data with a predetermined DC voltage or a DC voltage of 0 V (zero volts). The error correcting unit 30 outputs the waveform data, without any correction. The DAC 21 converts the waveform data into an analog value and outputs the analog value. That is, the DAC 21 outputs the I-phase component V$_I$ and the Q-phase component V$_Q$ with a predetermined DC voltage or a DC voltage of 0 V to the quadrature modulation unit 22). The local oscillator 6 outputs a carrier wave signal S$_C$ to the multiplier 2 and a 90-degree phase shifter 4, and the 90-degree phase shifter 4 shifts the carrier wave signal S$_C$ by 90 degrees and outputs the carrier wave signal to the multiplier 3. The adder 5 adds the output signals from the multipliers 2 and 3 and outputs an output signal S.

When the quadrature modulator 1 has ideal characteristics and the angular frequency of the carrier wave signal S$_C$ is ω$_C$, the output signal S is represented by [Expression 1].

$$S = V_I \cos \omega_C t + V_Q \sin \omega_C t \qquad \text{[Expression 1]}$$

In practice, since the modulation signal output from the quadrature modulator 1 includes the gain balance error, the zero offset error, and the orthogonality error, the output signal S is represented by [Expression 2]. In [Expression 2], φ$_C$ [rad] is an initial phase.

$$S = (V_I d_I + \delta_I)\cos\left(\omega_C t + \phi_C - \frac{\phi}{2}\right) + \qquad \text{[Expression 2]}$$
$$(V_Q d_Q + \delta_Q)\sin\left(\omega_C t + \phi_C + \frac{\phi}{2}\right)$$

When [Expression 2] is rearranged, [Expression 3] is obtained.

$$S = \left\{(V_I d_I + \delta_I)\cos\left(\frac{\phi}{2}\right) + (V_Q d_Q + \delta_Q)\sin\left(\frac{\phi}{2}\right)\right\} \qquad \text{[Expression 3]}$$
$$\cos(\omega_C t + \phi_C) +$$
$$\left\{(V_I d_I + \delta_I)\sin\left(\frac{\phi}{2}\right) + (V_Q d_Q + \delta_Q)\cos\left(\frac{\phi}{2}\right)\right\}$$
$$\sin(\omega_C t + \phi_C) = A_{Total}\cos(\omega_C t + \Phi)$$

However, in [Expression 3], A$_{Total}$ and Φ are represented by [Expression 4] and [Expression 5], respectively. A$_{Total}$ indicates an amplification component of the output signal S.

$$A_{Total} = \sqrt{(V_I d_I + \delta_I)^2 + (V_Q d_Q + \delta_Q)^2 + 2(V_I d_I + \delta_I)(V_Q d_Q + \delta_Q)\sin\phi} \qquad \text{[Expression 4]}$$

$$\Phi = \tan^{-1}\left\{\frac{(V_I d_I + \delta_I)\sin\phi_C - (V_Q d_Q + \delta_Q)\cos(\phi_C + \phi)}{(V_I d_I + \delta_I)\cos\phi_C + (V_Q d_Q + \delta_Q)\sin(\phi_C + \phi)}\right\} \quad \text{[Expression 5]}$$

Then, an I-phase gain balance error $d_I$ and a Q-phase gain balance error $d_Q$ are calculated.

First, the I-phase gain balance error $d_I$ can be calculated as follows on the basis of a power component $A^2_{Total}$ which is the square of the amplification component $A_{Total}$. In [Expression 4], the power component $A^2_{Total}$ at $V_Q=0$ is represented by [Expression 6].

$$A^2_{Total} = V_I^2 D_I + 2V_I \Delta_I + \Lambda [mV^2] \quad \text{[Expression 6]}$$

However, in [Expression 6], $D_I$, $\Delta_I$ and $\Lambda$ are represented by [Expression 7] to [Expression 9], respectively.

$$D_I = d_I^2 \quad \text{[Expression 7]}$$

$$\Delta_I = d_I \delta_I + d_I \delta_Q \sin\phi \quad \text{[Expression 8]}$$

$$\Lambda = \delta_I^2 + \delta_Q^2 + 2\delta_I \delta_Q \sin\phi \quad \text{[Expression 9]}$$

Three kinds of $V_I$ are set at $V_Q=0$ and $D_I$, $\Delta_I$ and $\Lambda$ can be calculated from the measured value of the power component $A^2_{Total}$ at each $V_I$. The I-phase gain balance error $d_I$ is calculated from the calculation result of $D_I$ by [Expression 10].

$$d_I = \sqrt{D_I} \quad \text{[Expression 10]}$$

Similarly to the above, the Q-phase gain balance error $d_Q$ can be calculated as follows. First, in [Expression 4], the power component $A^2_{Total}$ at $V_I=0$ is represented by [Expression 11].

$$A^2_{Total} = V_Q^2 D_Q + 2V_Q \Delta_Q + \Lambda [mV^2] \quad \text{[Expression 11]}$$

However, in [Expression 11], $D_Q$ and $\Delta_Q$ are represented by [Expression 12] and [Expression 13], respectively. In addition, $\Lambda$ is represented by the above-mentioned [Expression 9].

$$D_Q = d_Q^2 \quad \text{[Expression 12]}$$

$$\Delta_Q = d_Q \delta_Q + d_Q \delta_I \sin\phi \quad \text{[Expression 13]}$$

Three kinds of $V_Q$ are set at $V_I=0$ and $D_Q$ and $\Delta_Q$ can be calculated from the measured value of the power component $A^2_{Total}$ at each $V_Q$. The Q-phase gain balance error $d_Q$ is calculated from the calculation result of $D_Q$ by [Expression 14].

$$d_Q = \sqrt{D_Q} \quad \text{[Expression 14]}$$

Next, an orthogonality error $\phi$ is calculated. First, in [Expression 4], when the measured value of the power component $A^2_{Total}$ at $V_Q=0$ is represented by $A_0$, [Expression 15] is obtained.

$$V_I^2 d_I^2 + 2V_I d_I \delta_I + \delta_I^2 + \delta_Q^2 + 2(V_I d_I \delta_Q + \delta_I \delta_Q)\sin\phi = A_0 \quad \text{[Expression 15]}$$

In [Expression 4], when the measured value of the power component $A^2_{Total}$ at $V_I=0$ is represented by $A_1$, [Expression 16] is obtained.

$$V_Q^2 d_Q^2 + 2V_Q d_Q \delta_Q + \delta_I^2 + \delta_Q^2 + 2(V_Q d_Q \delta_I + \delta_I \delta_Q)\sin\phi = A_1 \quad \text{[Expression 16]}$$

When the measured value of the power component $A^2_{Total}$ at $V_I \neq 0$ and $V_Q \neq 0$ is represented by $A_2$, [Expression 17] is obtained from [Expression 4].

$$V_I^2 d_I^2 + 2V_I d_I \delta_I + \delta_I^2 + V_Q^2 d_Q^2 + 2V_Q d_Q \delta_Q + \delta_Q^2 + 2(V_I d_I V_Q d_Q + V_I d_I \delta_Q + V_Q d_Q \delta_I + \delta_I \delta_Q)\sin\phi = A_2 \quad \text{[Expression 17]}$$

When [Expression 15] and [Expression 16] are subtracted from [Expression 17], [Expression 18] is obtained.

$$-\delta_I^2 - \delta_Q^2 - 2\delta_I \delta_Q \sin\phi + 2V_I d_I V_Q d_Q \sin\phi = A_2 - (A_0 + A_1) \quad \text{[Expression 18]}$$

When [Expression 9] is substituted into [Expression 18], [Expression 19] is obtained.

$$-\Lambda + 2V_I d_I V_Q d_Q \sin\phi = A_2 - (A_0 + A_1) \quad \text{[Expression 19]}$$

[Expression 20] and [Expression 21] are obtained by [Expression 19] and the orthogonality error $\phi$ is calculated.

$$\sin\phi = \frac{A_2 + \Lambda - (A_0 + A_1)}{2V_I d_I V_Q d_Q} \quad \text{[Expression 20]}$$

$$\phi = \sin^{-1}\left\{\frac{A_2 + \Lambda - (A_0 + A_1)}{2V_I d_I V_Q d_Q}\right\} \quad \text{[Expression 21]}$$

Next, the zero offsets $\delta_I$ and $\delta_Q$ are calculated. [Expression 22] and [Expression 23] are obtained by [Expression 8] and [Expression 13] and the zero offsets $\delta_I$ and $\delta_Q$ are calculated.

$$\delta_I = \frac{\Delta_Q d_I \sin\phi - \Delta_I d_Q}{d_I d_Q (\sin^2\phi - 1)} \quad \text{[Expression 22]}$$

$$\delta_Q = \frac{\Delta_Q - d_Q \delta_I \sin\phi}{d_Q} \quad \text{[Expression 23]}$$

As described above, the I-phase gain balance error $d_I$, the Q-phase gain balance error $d_Q$, the orthogonality error $\phi$, and the zero offset errors $\delta_I$ and $\delta_Q$ can be calculated on the basis of the power component of the output signal S from the quadrature modulator 1. Therefore, in this embodiment, the quadrature modulation error calculating unit 40 can measure the power of the quadrature-modulated signal output from the level regulator 50 using the power measuring unit 41, thereby calculating the quadrature modulation errors. The correction value output unit 23 may generate correction values for removing the quadrature modulation errors and supply the correction values to the error correcting unit 30.

Next, the configuration of the error correcting unit 30 will be described with reference to FIG. 3. The correction values which are generated by the correction output unit 22 to remove the quadrature modulation errors are represented as follows. That is, a correction value for the I-phase gain balance error $d_I$ is represented by $d_{I\_COR}$ and a correction value for the Q-phase gain balance error $d_Q$ is represented by $d_{Q\_COR}$. In addition, a correction value for the orthogonality error $\phi$ is represented by $\phi_{COR}$, a correction value for the I-phase zero offset error $\delta_I$ is represented by $\delta_{I\_COR}$, and a correction value for the Q-phase zero offset error $\delta_Q$ is represented by $\delta_{Q\_COR}$.

Figure 3:
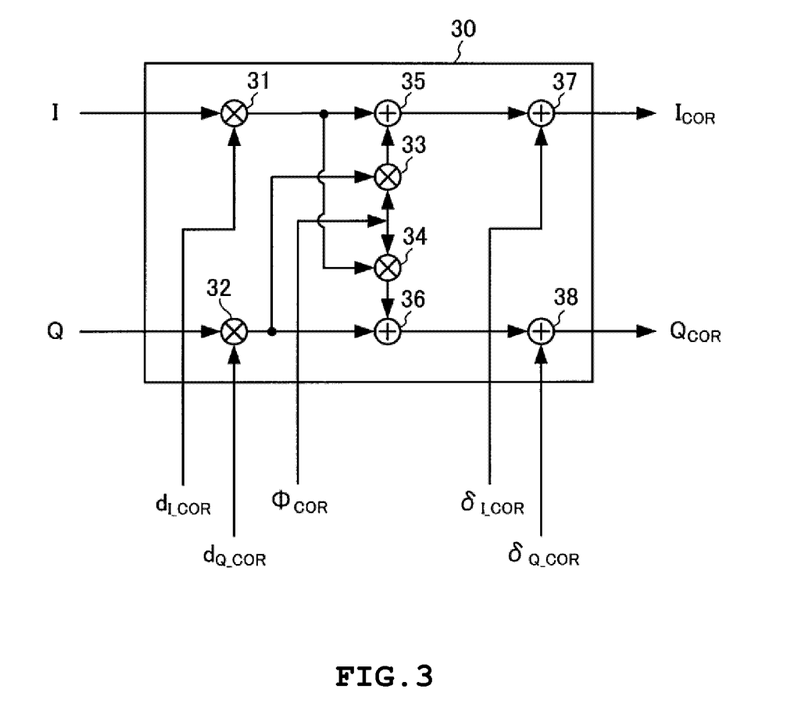
FIG. 3 is a block diagram illustrating the configuration of an error correcting unit of the signal generating device according to the embodiment of the invention.

As shown in FIG. 3, the error correcting unit 30 includes multipliers 31 to 34 and adders 35 to 38. The multipliers 31 to 34 are first to fourth multipliers according to the invention. The adders 35 to 38 are first to fourth adders according to the invention.

The multiplier 31 multiplies the I-phase component output from the waveform data storage unit 11 by the I-phase gain balance correction value $d_{I\_COR}$. The multiplier 32 multiplies the Q-phase component output from the waveform data storage unit 11 by the Q-phase gain balance correction value $d_{Q\_COR}$.

The multiplier 33 multiplies the multiplication result of the multiplier 32 by the orthogonality correction value $\phi_{COR}$. The multiplier 34 multiplies the multiplication result of the multiplier 31 by the orthogonality correction value $\phi_{COR}$.

The adder 35 adds the multiplication result of the multiplier 31 and the multiplication result of the multiplier 33. The adder 36 adds the multiplication result of the multiplier 32 and the multiplication result of the multiplier 34.

The adder 37 adds the addition result of the adder 35 and the I-phase zero offset correction value $\delta_{I\_COR}$. The adder 38 adds the addition result of the adder 36 and the Q-phase zero offset correction value $\delta_{Q\_COR}$.

As described above, the error correcting unit 30 can receive the I-phase component and the Q-phase component from the waveform data storage unit 11 and output the I-phase component $I_{COR}$ and the Q-phase component $Q_{COR}$, from which the quadrature modulation errors have been removed, to the DAC 21.

Next, the operation of the signal generating device 10 according to this embodiment will be described with reference to the block diagram shown in FIG. 1.

Figure 4:
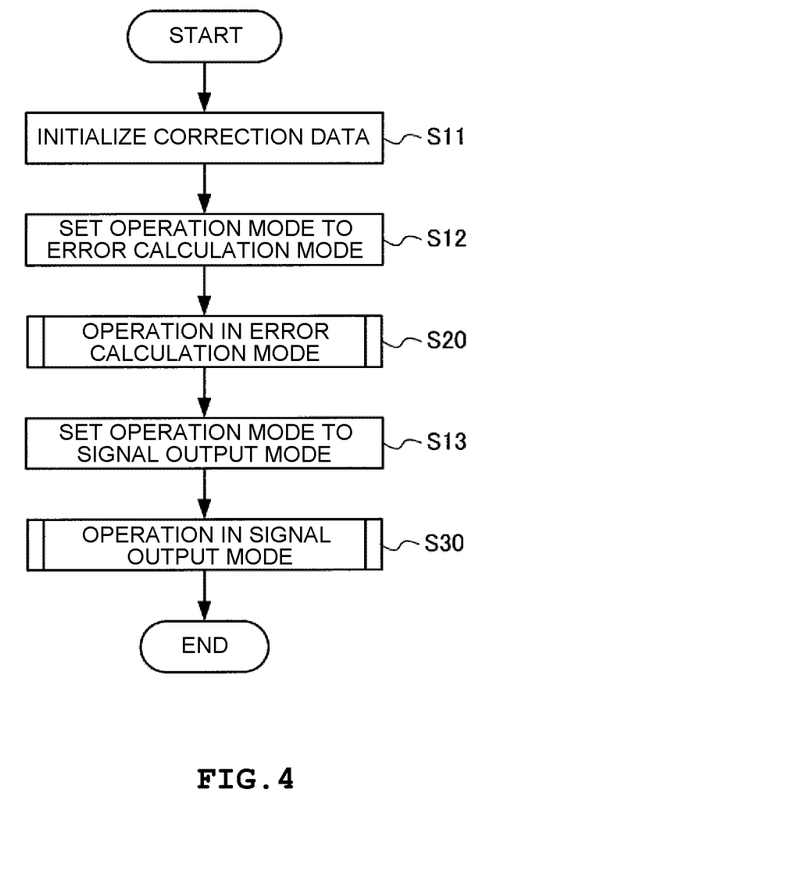
FIG. 4 is a flowchart illustrating the overall operation of the signal generating device according to the embodiment of the invention.

First, the overall operation of the signal generating device 10 will be described with reference to the flowchart shown in FIG. 4.

The control unit 15 initializes the correction values output from the correction value output unit 23 (step S11) such that the error correcting unit 30 does not perform correction.

The control unit 15 operates the mode switching unit 14 to set the operation mode to the error calculation mode (step S12). As a result, in the mode switching unit 14, the switch 14a is turned off and the switch 14b is turned on.

Then, the control unit 15 performs an operation in the error calculation mode (step S20).

When the operation in the error calculation mode ends, the control unit 15 operates the mode switching unit 14 to set the operation mode to the signal output mode (step S13). As a result, in the mode switching unit 14, the switch 14a is turned on and the switch 14b is turned off.

Then, the control unit 15 performs an operation in the signal output mode (step S30).

Figure 5:
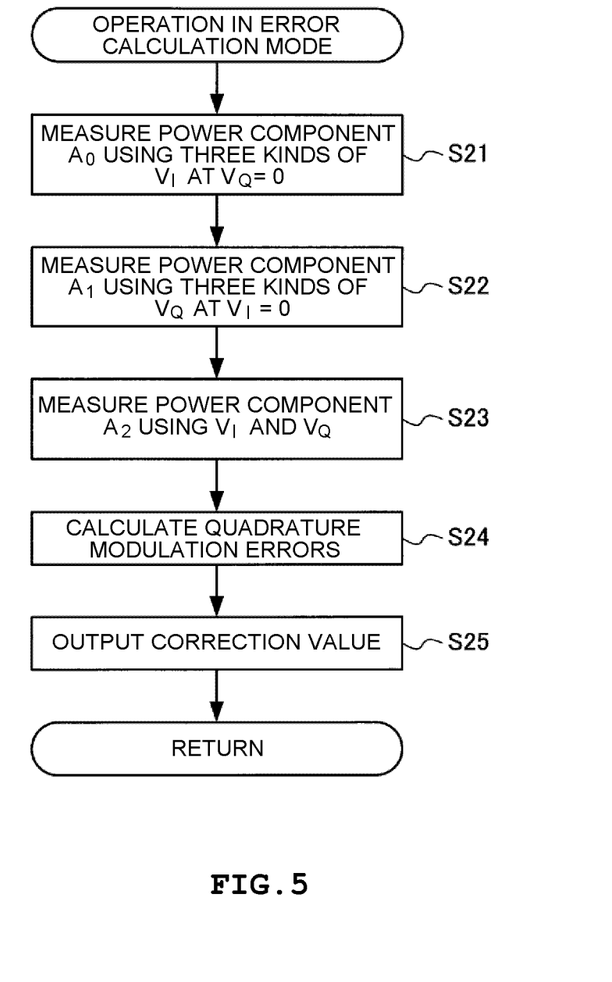
FIG. 5 is a flowchart illustrating an operation in the error calculation mode in the signal generating device according to the embodiment of the invention.

Next, the operation in the error calculation mode in step S20 of FIG. 4 will be described with reference to the flowchart shown in FIG. 5.

The control unit 15 directs the power measuring unit 41 to measure the power component $A_0$ on the basis of three kinds of I-phase components $V_I$ when the level $V_Q$ of the Q-phase component is zero (step S21).

When the three kinds of I-phase components $V_I$ are $V_{I1}$, $V_{I2}$, and $V_{I3}$, the control unit 15 directs the waveform data storage unit 11 to sequentially output signals indicating three combinations of $V_{I1}$ and $V_Q=0$, $V_{I2}$ and $V_Q=0$, and $V_{I3}$ and $V_Q=0$ and directs the power measuring unit 41 to measure the power component $A_0$ of the modulation signal output from the level regulator 50.

Then, the control unit 15 directs the power measuring unit 41 to measure the power component $A_1$ on the basis of three kinds of Q-phase components $V_Q$ when the I-phase component $V_I$ is zero (step S22).

When the three kinds of Q-phase components $V_Q$ is $V_{Q1}$, $V_{Q2}$, and $V_{Q3}$, the control unit 15 directs the waveform data storage unit 11 to sequentially output signals indicating three combinations of $V_I=0$ and $V_{Q1}$, $V_I=0$ and $V_{Q1}$, and $V_I=0$ and $V_{Q1}$ and directs the power measuring unit 41 to measure the power component $A_1$ of the modulation signal output from the level regulator 50.

The control unit 15 directs the waveform data storage unit 11 to output a signal indicating a combination of, for example, $V_I=V_{I1}$ and $V_Q=V_{Q1}$ and directs the power measuring unit 41 to measure the power component $A_2$ of the modulation signal output from the level regulator 50 (step S23).

The quadrature modulation error calculating unit 40 calculates the quadrature modulation errors from the measurement result (step S24).

Specifically, the gain balance error calculating unit 42 calculates $D_I$, $\Delta_I$, and $\Lambda$ on the basis of the result of step S21 using [Expression 6] to [Expression 9] and calculates the I-phase gain balance error $d_I$ using [Expression 10]. In addition, the gain balance error calculating unit 42 calculates $D_Q$ and $\Delta_Q$ on the basis of the result of step S22 using [Expression 11] to [Expression 13] and calculates the Q-phase gain balance error $d_Q$ using [Expression 14].

The zero offset error calculating unit 43 calculates the I-phase zero offset error $\delta_I$ and the Q-phase zero offset error $\delta_Q$ on the basis of the power components $A_0$, $A_1$ and $A_2$ calculated in Steps S21 to S23 using [Expression 22] and [Expression 23].

The orthogonality error calculating unit 44 calculates the orthogonality error $\phi$ on the basis of the power components $A_0$, $A_1$ and $A_2$ calculated in Steps S21 to S23 using [Expression 21].

The control unit 15 directs the correction value output unit 23 to generate the correction values for removing the quadrature modulation errors, that is, the I-phase gain balance correction value $d_{I\_COR}$, the Q-phase gain balance correction value $d_{Q\_COR}$, the orthogonality correction value $\phi_{COR}$, the I-phase zero offset correction value $\delta_{I\_COR}$, and the Q-phase zero offset correction value $\delta_{Q\_COR}$ and output the correction value to the error correcting unit 30 (step S25).

Figure 6:
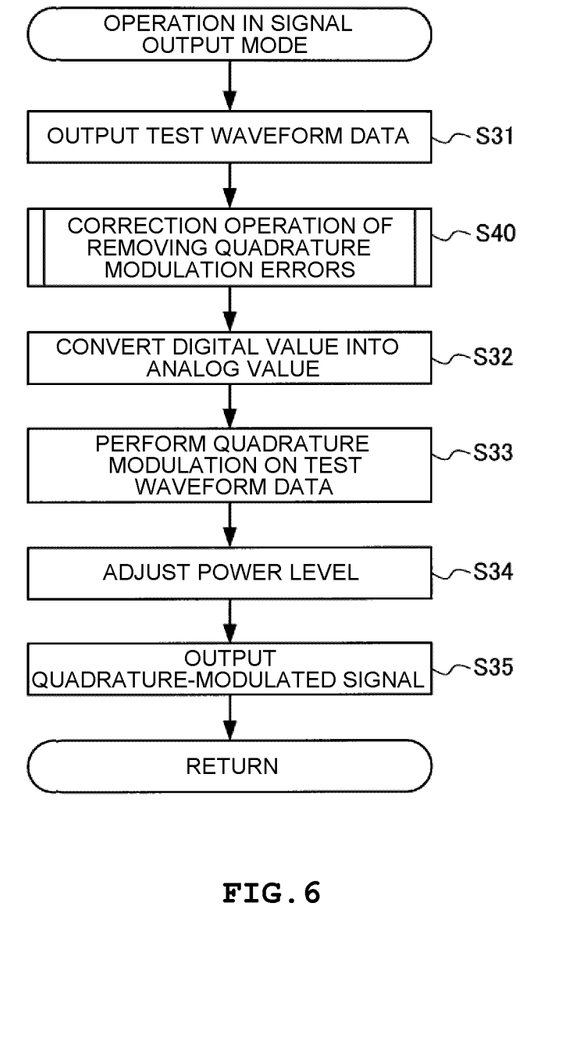
FIG. 6 is a flowchart illustrating an operation in the signal output mode in the signal generating device according to the embodiment of the invention.

Next, the operation in the signal output mode in Step S30 of FIG. 4 will be described with reference to the flowchart shown in FIG. 6.

First, the control unit 15 outputs the waveform designation signal to the waveform data storage unit 11 such that the waveform data storage unit 11 outputs predetermined test waveform data in the stored waveform data (digital value) (step S31).

Figure 7:
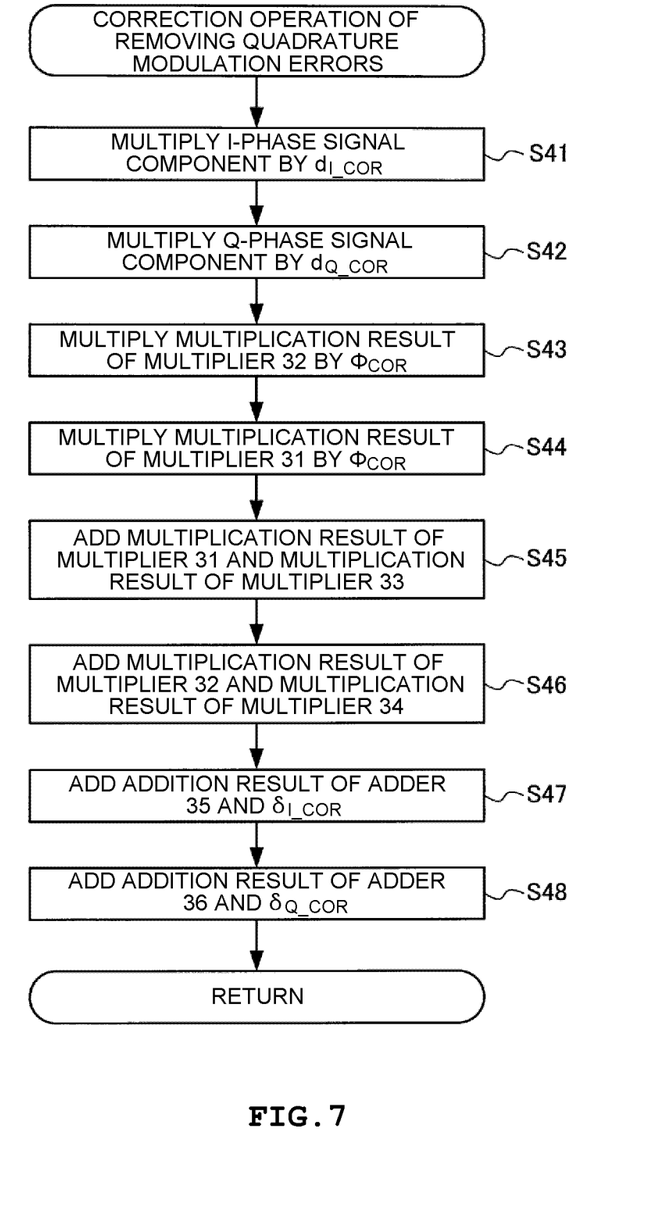
FIG. 7 is a flowchart illustrating an operation of correcting the quadrature modulation errors in the signal generating device according to the embodiment of the invention.

Then, the error correcting unit 30 performs a correction process on the test waveform data to remove the quadrature modulation errors (step S40) and outputs the corrected data to the DAC 21. Specifically, the error correcting unit 30 (see FIG. 3) performs correction to remove the quadrature modulation errors, as shown in the flowchart of FIG. 7.

The multiplier 31 multiplies the I-phase component output from the waveform data storage unit 11 by the I-phase gain balance correction value $d_{I\_COR}$ (step S41).

The multiplier 32 multiplies the Q-phase component output from the waveform data storage unit 11 by the Q-phase gain balance correction value $d_{Q\_COR}$ (step S42).

The multiplier 33 multiplies the multiplication result of the multiplier 32 by the orthogonality correction value $\phi_{COR}$ (step S43).

The multiplier 34 multiplies the multiplication result of the multiplier 31 by the orthogonality correction value $\phi_{COR}$ (step S44).

The adder 35 adds the multiplication result of the multiplier 31 and the multiplication result of the multiplier 33 (step S45).

The adder 36 adds the multiplication result of the multiplier 32 and the multiplication result of the multiplier 34 (step S46).

The adder 37 adds the addition result of the adder 35 and the I-phase zero offset correction value $\delta_{I\_COR}$ (step S47).

The adder 38 adds the addition result of the adder 36 and the Q-phase zero offset correction value $\delta_{Q\_COR}$ (step S48).

Returning to FIG. 6, the DAC 21 converts the corrected digital test waveform data into analog test waveform data (step S32) and outputs the analog test waveform data to the quadrature modulation unit 22.

The quadrature modulation unit 22 performs quadrature modulation on the test waveform data on the basis of the carrier wave signal with a local oscillating frequency output from the local oscillator 13 (step S33) and outputs the quadrature-modulated signal to the amplifier 12. The frequency of the local oscillator 13 is set in advance by the control unit 15.

The amplifier 12 amplifies the quadrature-modulated signal at a predetermined gain and outputs the amplified quadrature-modulated signal to the level regulator 50. The level regulator 50 changes the amount of attenuation of the variable attenuator 51 to adjust the power level of the quadrature-modulated signal such that the power level is, for example, −10 dBm (step S34), and outputs the quadrature-modulated signal adjusted to a predetermined power level to the device to be tested (step S35).

Specifically, in the level regulator 50, the variable attenuator 51 attenuates the level of the output signal from the amplifier 12 to a predetermined value on the basis of the attenuation setting signal from the comparator 55 and outputs the attenuated signal to the detector 52. The detector 52 detects an input signal and outputs the detected signal to the ADC 53. The ADC 53 converts an input analog signal into a digital signal and outputs the digital signal to the comparator 55. The comparator 55 compares the level of an input signal with the level of the reference signal from the reference value output unit 54 and outputs the attenuation setting signal to the variable attenuator 51 such that the power level of the output signal from the variable attenuator 51 is, for example, −10 dBm. In practice, the output of the variable attenuator 51 is attenuated to a desired level by a step attenuator (not shown) and is then output as an RF signal from the signal generating device 10.

As described above, in the signal generating device 10 according to this embodiment, the quadrature modulation error calculating unit 40 includes the power measuring unit 41 which measures the power of the quadrature-modulated signal, the gain balance error calculating unit 42 which calculates the gain balance error on the basis of the measured power, the zero offset error calculating unit 43 which calculates the zero offset error, and the orthogonality error calculating unit 44 which calculates the orthogonality error. Therefore, the signal generating device 10 can correct the gain balance error, the zero offset error, and the orthogonality error that occur during quadrature modulation.

INDUSTRIAL APPLICABILITY

As described above, the quadrature modulator, the signal generating device, and the quadrature modulation method according to the invention have the effect of correcting the gain balance error, the zero offset error, and the orthogonality error that occur during quadrature modulation and are useful as a quadrature modulator, a signal generating device, and a quadrature modulation method which corrects the quadrature modulation errors that occur during quadrature modulation.

| Description of Reference Numerals and Signs | |
|---|---|
| 10: | SIGNAL GENERATING DEVICE |
| 11: | WAVEFORM DATA STORAGE UNIT (BASEBAND SIGNAL SUPPLY MEANS) |
| 12: | AMPLIFIER |
| 13: | LOCAL OSCILLATOR (CARRIER WAVE SIGNAL GENERATING MEANS) |
| 14: | MODE SWITCHING UNIT |
| 14A, 14B: | SWITCH |
| 15: | CONTROL UNIT |
| 20: | QUADRATURE MODULATOR |
| 21: | DAC |
| 22: | QUADRATURE MODULATION UNIT |
| 23: | CORRECTION VALUE OUTPUT UNIT |
| 30: | ERROR CORRECTING UNIT |
| 31 TO 34: | MULTIPLIER (FIRST TO FOURTH MULTIPLIERS) |
| 35 TO 38: | ADDER (FIRST TO FOURTH ADDERS) |
| 40: | QUADRATURE MODULATION ERROR CALCULATING UNIT |
| 41: | POWER MEASURING UNIT |
| 42: | GAIN BALANCE ERROR CALCULATING UNIT |
| 43: | ZERO OFFSET ERROR CALCULATING UNIT |
| 44: | ORTHOGONALITY ERROR CALCULATING UNIT |
| 50: | LEVEL REGULATOR |
| 51: | VARIABLE ATTENUATOR |
| 52: | DETECTOR |
| 53: | ADC |
| 54: | REFERENCE VALUE OUTPUT UNIT |
| 55: | COMPARATOR |

The invention claimed is:

1. A quadrature modulator that corrects quadrature modulation errors included in a quadrature-modulated signal, comprising:

a quadrature modulation unit that receives a baseband signal including an in-phase component and a quadrature component, modulates two carrier wave signals which are orthogonal to each other using the baseband signal to obtain the quadrature-modulated signal, and outputs the quadrature-modulated signal;

a quadrature modulation error calculating unit; and an error correcting unit, wherein the quadrature modulation errors include a gain balance error indicating that the gains of the in-phase component and the quadrature component are different from each other, a zero offset error indicating the offsets of an in-phase component axis and a quadrature component axis from the origins of each axis, and an orthogonality error indicating the deviation of orthogonalities of the in-phase component axis and the quadrature component axis, the quadrature modulation error calculating unit calculates the gain balance error, the zero offset error, and the orthogonality error included in the quadrature modulation errors on the basis of the power of the quadrature-modulated signal output from the quadrature modulation unit when the baseband signal in which the in-phase component and the quadrature component are predetermined DC voltages is received, and the error correcting unit corrects the baseband signal such that the quadrature modulation errors calculated by the quadrature modulation error calculating unit are removed, wherein the error correcting unit includes:

a first multiplier that multiplies the in-phase component of the input baseband signal by a gain balance correction value for removing the gain balance error of the in-phase component;

a second multiplier that multiplies the quadrature component of the input baseband signal by a gain balance correction value for removing the gain balance error of the quadrature component;

a third multiplier that multiplies the multiplication result of the second multiplier by an orthogonality correction value for removing the orthogonality error;

a fourth multiplier that multiplies the multiplication result of the first multiplier by the orthogonality correction value;
a first adder that adds the multiplication result of the first multiplier and the multiplication result of the third multiplier;
a second adder that adds the multiplication result of the second multiplier and the multiplication result of the fourth multiplier;
a third adder that adds the addition result of the first adder and a zero offset correction value for removing the zero offset error of the in-phase component and outputs the addition result to the quadrature modulation unit; and
a fourth adder that adds the addition result of the second adder and a zero offset correction value for removing the zero offset error of the quadrature component and outputs the addition result to the quadrature modulation unit.

2. The quadrature modulator according to claim 1,
wherein the quadrature modulation error calculating unit includes:
a power measuring unit that measures the power of the quadrature-modulated signal output from the quadrature modulation unit;
a gain balance error calculating unit that calculates the gain balance error on the basis of the power measured by the power measuring unit;
a zero offset error calculating unit that calculates the zero offset error on the basis of the power measured by the power measuring unit; and
an orthogonality error calculating unit that calculates the orthogonality error on the basis of the power measured by the power measuring unit.

3. A quadrature modulator that corrects quadrature modulation errors included in a quadrature-modulated signal, comprising:
a quadrature modulation unit that receives a baseband signal including an in-phase component and a quadrature component, modulates two carrier wave signals which are orthogonal to each other using the baseband signal to obtain the quadrature-modulated signal, and outputs the quadrature-modulated signal;
a quadrature modulation error calculating unit; and
an error correcting unit,
wherein the quadrature modulation errors include a gain balance error indicating that the gains of the in-phase component and the quadrature component are different from each other, a zero offset error indicating the offsets of an in-phase component axis and a quadrature component axis from the origins of each axis, and an orthogonality error indicating the deviation of orthogonalities of the in-phase component axis and the quadrature component axis,
the quadrature modulation error calculating unit calculates the gain balance error, the zero offset error, and the orthogonality error included in the quadrature modulation errors on the basis of the power of the quadrature-modulated signal output from the quadrature modulation unit when the baseband signal in which the in-phase component and the quadrature component are predetermined DC voltages is received, and
the error correcting unit corrects the baseband signal such that the quadrature modulation errors calculated by the quadrature modulation error calculating unit are removed,
wherein the quadrature modulation error calculating unit includes:

a power measuring unit that measures the power of the quadrature-modulated signal output from the quadrature modulation unit;
a gain balance error calculating unit that calculates the gain balance error on the basis of the power measured by the power measuring unit;
a zero offset error calculating unit that calculates the zero offset error on the basis of the power measured by the power measuring unit; and
an orthogonality error calculating unit that calculates the orthogonality error on the basis of the power measured by the power measuring unit, and,
wherein the power measuring unit measures power values of the quadrature-modulated signals when the in-phase component of the baseband signal is three different predetermined DC voltages and the quadrature component of the baseband signal is a DC voltage of 0 V, power values of the quadrature-modulated signals when the quadrature component of the baseband signal is three different predetermined DC voltages and the in-phase component of the baseband signal is a DC voltage of 0 V, and power values of the quadrature-modulated signals when the in-phase component and the quadrature component of the baseband signal are different predetermined DC voltages.

4. A signal generating device comprising:
the quadrature modulator according to claim 3;
baseband signal supply means for supplying the baseband signal to the error correcting unit;
carrier wave signal generating means for generating the carrier wave signal and outputting the carrier wave signal to the quadrature modulation unit; and
a mode switching unit that switches an operation mode between an error calculation mode in which the quadrature modulation error calculating unit calculates the quadrature modulation errors and a signal output mode in which the quadrature modulator outputs the quadrature-modulated signal from which the quadrature modulation errors have been removed.

5. A quadrature modulation method that corrects quadrature modulation errors in a quadrature-modulated signal which is obtained by modulating two carrier wave signals orthogonal to each other using a baseband signal including an in-phase component and a quadrature component and outputs the quadrature-modulated signal, the quadrature modulation errors including a gain balance error indicating that the gains of the in-phase component and the quadrature component are different from each other, a zero offset error indicating the offsets of an in-phase component axis and a quadrature component axis from the origins of each axis, and an orthogonality error indicating the deviation of orthogonalities of the in-phase component axis and the quadrature component axis, the method comprising:
a quadrature modulation error calculating step of calculating the gain balance error, the zero offset error, and the orthogonality error included in the quadrature modulation errors on the basis of the power of the quadrature-modulated signal when the baseband signal in which the in-phase component and the quadrature component are predetermined DC voltages is received;
an error correcting step of correcting the baseband signal such that the quadrature modulation errors calculated in the quadrature modulation error calculating step are removed; and
a quadrature-modulated signal output step of receiving the baseband signal corrected such that the quadrature modulation errors are removed and outputting the quadrature-modulated signal, wherein the error correcting step includes:

a first multiplication step of multiplying the in-phase component of the input baseband signal by a gain balance correction value for removing the gain balance error of the in-phase component;

a second multiplication step of multiplying the quadrature component of the input baseband signal by a gain balance correction value for removing the gain balance error of the quadrature component;

a third multiplication step of multiplying the multiplication result of the second multiplication step by an orthogonality correction value for removing the orthogonality error;

a fourth multiplication step of multiplying the multiplication result of the first multiplication step by the orthogonality correction value;

a first addition step of adding the multiplication result of the first multiplication step and the multiplication result of the third multiplication step;

a second addition step of adding the multiplication result of the second multiplication step and the multiplication result of the fourth multiplication step;

a third addition step of adding the addition result of the first addition step and a zero offset correction value for removing the zero offset error of the in-phase component; and a fourth addition step of adding the addition result of the second addition step and a zero offset correction value for removing the zero offset error of the quadrature component.

6. The quadrature modulation method according to claim 5, wherein the quadrature modulation error calculating step includes a power measuring step of measuring the power of the quadrature-modulated signal and calculates the gain balance error, the zero offset error, and the orthogonality error on the basis of the measured power.

7. A quadrature modulation method that corrects quadrature modulation errors in a quadrature-modulated signal which is obtained by modulating two carrier wave signals orthogonal to each other using a baseband signal including an in-phase component and a quadrature component and outputs the quadrature-modulated signal, the quadrature modulation errors including a gain balance error indicating that the gains of the in-phase component and the quadrature component are different from each other, a zero offset error indicating the offsets of an in-phase component axis and a quadrature component axis from the origins of each axis, and an orthogonality error indicating the deviation of orthogonalities of the in-phase component axis and the quadrature component axis, the method comprising:

a quadrature modulation error calculating step of calculating the gain balance error, the zero offset error, and the orthogonality error included in the quadrature modulation errors on the basis of the power of the quadrature-modulated signal when the baseband signal in which the in-phase component and the quadrature component are predetermined DC voltages is received;

an error correcting step of correcting the baseband signal such that the quadrature modulation errors calculated in the quadrature modulation error calculating step are removed; and a quadrature-modulated signal output step of receiving the baseband signal corrected such that the quadrature modulation errors are removed and outputting the quadrature-modulated signal, wherein the quadrature modulation error calculating step includes a power measuring step of measuring the power of the quadrature-modulated signal and calculates the gain balance error, the zero offset error, and the orthogonality error on the basis of the measured power, and wherein the power measuring step measures power values of the quadrature-modulated signals when the in-phase component of the baseband signal is three different predetermined DC voltages and the quadrature component of the baseband signal is a DC voltage of 0 V, power values of the quadrature-modulated signals when the quadrature component of the baseband signal is three different predetermined DC voltages and the in-phase component of the baseband signal is a DC voltage of 0 V, and power values of the quadrature-modulated signals when the in-phase component and the quadrature component of the baseband signal are different predetermined DC voltages.

8. A signal generating device comprising:

the quadrature modulator according to claim 1;

baseband signal supply means for supplying the baseband signal to the error correcting unit;

carrier wave signal generating means for generating the carrier wave signal and outputting the carrier wave signal to the quadrature modulation unit; and a mode switching unit that switches an operation mode between an error calculation mode in which the quadrature modulation error calculating unit calculates the quadrature modulation errors and a signal output mode in which the quadrature modulator outputs the quadrature-modulated signal from which the quadrature modulation errors have been removed.

* * * * *